April 8, 1952 J. COLLARD 2,591,919
ELECTRICAL APPARATUS FOR DETECTING
THE PRESENCE OF MOVING OBJECTS
Filed April 3, 1946

INVENTOR.
John Collard
BY H. G. Grover
ATTORNEY

Patented Apr. 8, 1952

2,591,919

UNITED STATES PATENT OFFICE 2,591,919

ELECTRICAL APPARATUS FOR DETECTING THE PRESENCE OF MOVING OBJECTS

John Collard, London, England, assignor to Electric and Musical Industries, Limited, a British company Application April 3, 1946, Serial No. 659,196
In Great Britain January 20, 1941

Section 1, Public Law 690, August 8, 1946
Patent expires January 20, 1961

16 Claims. (Cl. 343—9)

This invention relates to electrical methods and apparatus for detecting the presence of moving objects.

It has been proposed to detect the presence of moving objects such as aircraft by transmitting at spaced time intervals high frequency oscillations in the form of pulses of short duration, the signals being transmitted from some form of directive aerial and the signals reflected by the aircraft and received by a suitable receiver serving to indicate, by measuring the time interval between the transmission of a pulse and the reception of its reflection, the distance away of the moving object. It is also possible to obtain an indication of the position of the moving object with respect to the point of transmission or reception.

In the case where it is desired to ascertain the distance of the object from the transmitter, the time interval between the transmission and reception of a pulse is usually measured by means of a cathode ray tube the beam of which is caused to travel horizontally across the screen of the tube at a predetermined rate. At the instant of transmitting a signal a vertical deflection is imparted to the beam which thus produces a vertical trace on the screen which constitutes the zero on the horizontal scale. When a reflected signal is received it is amplified and applied to the cathode ray tube producing a second vertical trace, the distance between the two traces thus providing an indication of the distance away of the object.

Since the aerial system from which the signals are transmitted is only partially directive, reflected signals are received not only from the moving object which is to be located, but also from stationary objects on the ground, such as buildings and hills. The vertical traces produced on the screen of the cathode ray tube by these unwanted reflections from stationary objects may partially or entirely obscure the trace produced by the signal received from the moving object and since it is not readily possible to distinguish the wanted from the unwanted traces accurate location of the moving object is not possible.

The object of the present invention is to provide an improved method of and apparatus for facilitating distinction between signals received from moving objects and signals received from stationary objects.

The invention is based on the fact that the phase of the oscillations of the reflected signals changes with respect to the phase of the oscillations of the transmitted signals as the object moves, whilst in the case of signals reflected from stationary objects the phase of the oscillations of the signals received from such objects remains fixed with respect to the phase of the oscillations of the signals transmitted. It is possible to convert these phase variations into amplitude variations so that successive signals received from a moving object will vary in amplitude while successive signals received from stationary objects will remain of constant amplitude.

Thus, according to the present invention there is provided a method of detecting the presence of a moving object which comprises transmitting oscillatory signals at spaced time intervals and receiving said signals after reflection by said object, wherein in order to distinguish signals reflected by said moving object from signals reflected by stationary objects the change or phase which occurs between the signals received from said moving object and signals bearing a fixed phase relationship with the signals transmitted, as said object moves is utilized to enable successive signals received from said moving object to be converted into signals of varying amplitude. Thus, by comparing the reflected signals received after the transmission of one burst of oscillation with the signals received from the previous burst of oscillation, it is possible to distinguish the signals received from a moving object since the amplitude of the signal corresponding to the first-mentioned burst of oscillation will be changed compared with the amplitude of the signal corresponding to said previous burst of oscillation.

The invention provides apparatus for converting the change of phase into a variation in amplitude and for effectively separating signals received from stationary objects from signals received from a moving object so that the trace on the cathode ray tube will not be obscured by the presence of reflections from stationary objects.

In order that the invention may be more clearly understood and readily carried into effect a method and apparatus for detecting the presence or the distance of a moving object will now be described in greater detail by way of example with reference to the drawing in which.

In the two figures, similar parts are indicated by similar reference characters.

Figure 1:
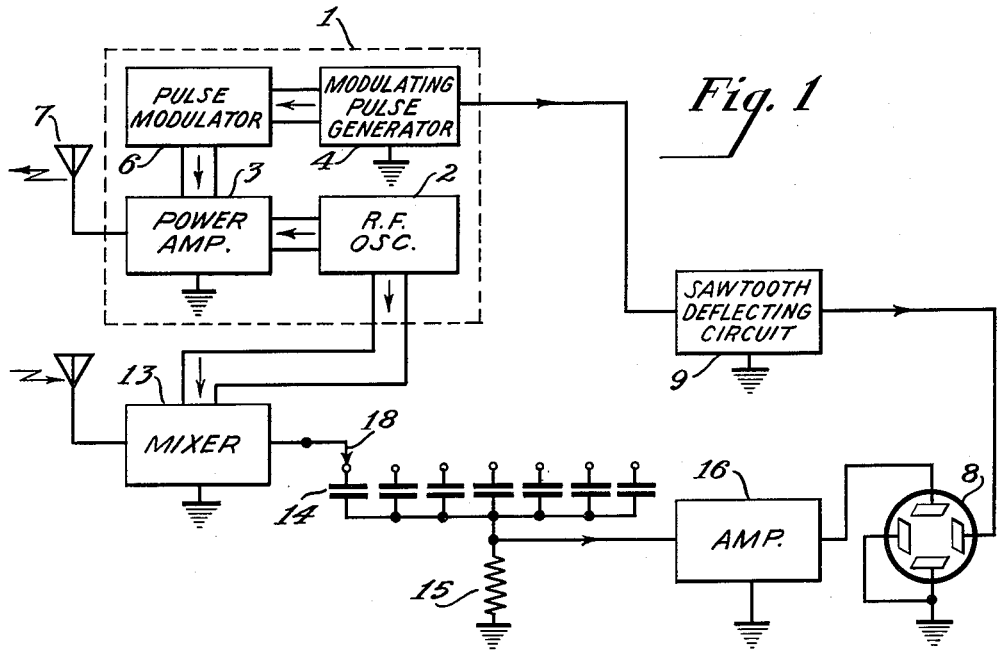
Figure 1 is an explanatory diagram of the invention.

The invention will be described with reference to Figs. 1 and 2 as applied by way of example to a method and apparatus for detecting the presence of aircraft. In such case a suitable form of transmitter 1 is provided which generates a carrier wave of a frequency of, for example, 100 megacycles per second, this carrier wave being modulated by short pulses of, for example, 2 microseconds' duration occurring every 1300 microseconds. The transmitter may comprise a radio frequency oscillator 2, a power amplifier 3, a pulse generator 4, and a modulator 6 for pulse modulating the amplified carrier wave. These signals are transmitted from a suitable directive aerial 7 and after reflection are received, amplified and fed to a cathode ray tube 8 upon the luminescent screen of which vertical traces are caused to appear with the transmission of a signal and with the reception of a reflected signal so as to afford a measure of the distance of the aircraft. The change of phase which occurs with signals received from a moving object is utilized in carrying out the present invention by converting successive signals of different phase received from moving objects into signals of varying amplitude so as to permit ready comparison to be made between signals received from stationary objects, the amplitudes of which will remain constant during successive cycles.

The conversion of the change of phase into an amplitude variation can be effected in a variety of ways by mixing with the oscillations of the received signals, some of the original carrier oscillations after suitably adjusting the amplitude of the latter and the mixed signals may be passed through a rectifier which produces in its output circuit a signal the amplitude of which is dependent upon the phase difference between the mixed oscillations. If a carrier wave $E \sin \omega t$ is transmitted and a stationary object at a distance $d$ reflects some of the transmitted energy back to a receiver the reflected wave on reception will be delayed by a time $$\frac{2d}{v}$$

where $v$ is the velocity of the wave. By mixing the oscillations of the reflected signals with the carrier oscillations and passing them through a rectifier a term of the form $E \sin \omega t \sin (\omega t + \theta)$ will be produced where $\theta$ is the angle corresponding to the delay $$\frac{2d}{v}$$

The average value of this term taken over a succession of transmitted pulses is proportional to $\cos \theta$ and is therefore dependent on the distance $d$.

Thus, if the object is stationary so that $d$ is constant, $\cos \theta$ would also be constant, but if the object is moving relatively to the transmitter, $d$ will vary and likewise $\cos \theta$ will vary. Hence, the rectified signals derived from signals received from a stationary object will be of constant amplitude whilst the amplitude of the rectified signals derived from a moving object will vary. It will, therefore, be appreciated that by comparing successive signals received over a predetermined period it is readily possible to determine the signals received from moving objects since, of course, the amplitude of such signals will vary, whereas the amplitude of signals received from stationary objects will remain constant over said period.

It is preferred in utilizing the invention where the received signals are applied to a cathode ray tube to effect the necessary separation of the signals received from the moving object from the signals received from stationary objects by a suitable form of switching device which enables the signals received after transmitting a signal to be compared with the signals received after transmitting the previous signal. As shown in Fig. 1, the reference numeral 13 indicates a receiver which produces output signals the amplitudes of which are dependent on the phase difference between the oscillations of the signals transmitted and the oscillations of the signals received. The receiver may contain a mixing circuit of the form used in a superheterodyne receiver, signals from the transmitter and received signals being together applied to the mixer which should have a square law to give the term $E \sin \omega t \sin (\omega t + \theta)$ previously referred to.

The output of the receiver is arranged to be fed in succession over a predetermined time interval to a series of condensers 14, one of the electrodes of each condenser being connected together and to a common resistance 15, one end of which is earthed, as shown. The junction of the resistance and the condensers is connected to an amplifier 16 which amplifies signals appearing across the resistance 15 and applies them to a cathode ray tube 8, the beam of which is caused to travel across the screen of the cathode ray tube at a predetermined rate by means of a deflecting circuit 9 so that any signals appearing across the resistance 15 will cause a vertical deflection of the beam. As the beam commences to travel across the screen, a switch arm 18 commences to traverse the series of condenser contacts, thus connecting the output of the receiver to the condensers in turn so that the output of the receiver during the period that the beam is travelling across the screen is applied successively to the series of condensers. When the beam reaches its limit of travel, it is returned to the initial position to commence a further cycle and the contact arm 18 is likewise returned to the first condenser contact so as to recommence its cycle. As the switch arm 18 and the beam commence their travel, a signal is transmitted by the transmitter and if at any instant thereafter, a reflected signal is received the output of the receiver 13 will be applied to whichever condenser the switch arm is in contact with at that instant so that a charge will accumulate at the condenser depending on the amplitude of the signal appearing at that instant in the output of the receiver.

Thus, throughout the cycle if a reflected signal is received either from a stationary or a moving object some of the condensers will be charged to an appropriate value. As the switch arm commences a further cycle a further signal is transmitted and further reflected pulses are received. If a reflected pulse is received from a stationary object the voltage produced in the output of the receiver at that instant will be the same as it was in the previous cycle at the corresponding instant and hence no additional charge will be applied to the appropriate condenser so that no current will flow through the resistance 15 and hence, no vertical deflection will be imparted to the beam of the cathode ray tube.

If, however, a received signal is reflected by a moving object, then, due to the difference of phase between the oscillations of the received signal and the oscillations transmitted, which will have been produced during the interval between successive signals, the voltage appearing in the output of the receiver 13 will not be the same as it was at the corresponding instant in the previous cycle so that current will flow into or out of the appropriate condenser to charge it to a new voltage, such current flow through the resistance 15 causing a vertical deflection of the beam of the cathode ray tube. Thus, as the switch arm 18 successively connects the condensers to the output of the receiver 13 no vertical deflection is applied to the cathode ray beam so long as no variation in the charge of the condensers occurs compared with the charge of the previous cycle. When, however, a signal from a moving object is received the condenser to which the switch arm is then connected changes its charge and a vertical deflection is imparted to the beam of the cathode ray tube.

It will thus be appreciated that after a few cycles a steady state is established and the only vertical deflection of the beam that occurs after the transmission of a signal in one cycle will be that due to the receipt of the signal from a moving object. Hence, any tendency for such deflection to be obscured by deflections due to signals received for stationary objects will be removed.

Figure 2:
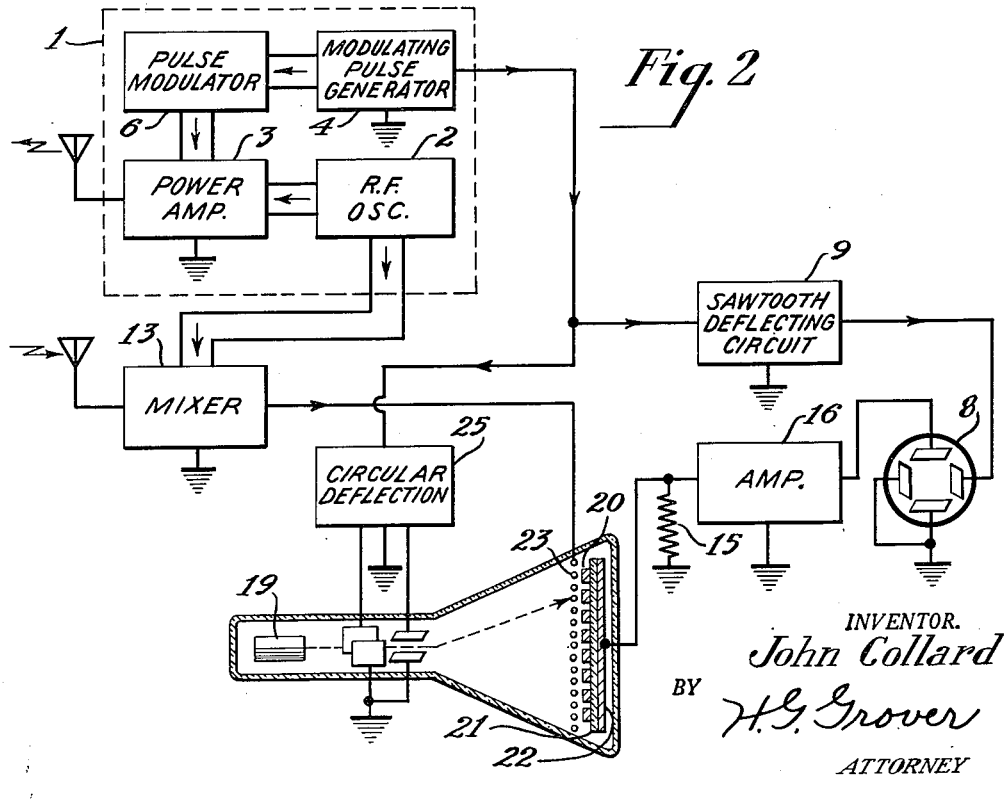
Figure 2 illustrates diagrammatically a form of electrically operated switch for use in separating signals received from stationary objects from signals received from moving objects.

It is, of course, impracticable to use a mechanical switch such as is diagrammatically shown in Figure 1 and, accordingly, a preferred form of switch is one in which the switching operation is effectively performed electronically. Such a form of switch is shown in Figure 2 and comprises within an evacuated envelope a cathode ray gun 19, diagrammatically indicated, which generates a beam of electrons which is deflected in such a manner that it impinges in turn on a series of conducting elements 20 mounted on an insulating plate 21, such as a sheet of mica, which is backed by a conducting plate 22. The conducting elements 20 are composed of material which readily emits secondary electrons under bombardment by a beam of primary electrons and in association with the insulating plate 21 and the conducting plate 22 they form a series of condensers.

Preferably, the conducting elements 20 are arranged in the form of a circle and the cathode ray beam from the gun 19 is caused to impinge on the elements 20 by deflecting the beam by means of a deflecting circuit 25 under the action of a suitable rotating field. Disposed in front of the elements 20 is a grid 23 to which the output of the receiver 13 is connected. The conducting plate 22 is connected to a resistance 15 earthed as shown and the junction between the conducting plate 22 and the resistance 15 is connected to the amplifier 16.

As the beam from the cathode ray gun impinges on the elements 20 in turn each element is caused to emit secondary electrons and due to the potential of the grid 23 which is connected as stated above to the output of the receiver 13 these secondary electrons will be repelled or attracted, so causing the individual condensers to charge or discharge and producing a voltage difference across the resistance 15 if the charge across the condenser differs from what it was in the previous cycle. Thus, the arrangement operates in a manner similar to the mechanical switch described in Figure 1.

The presence of a moving object may, as previously stated, be indicated by vertical deflections of a horizontal trace on the fluorescent screen of a cathode ray tube corresponding to the tube 8 in Figure 1. In order to provide an indication of the distance of the moving object, an initial vertical deflection is imparted to the electron beam of the tube 8 simultaneously with the transmission of the signal or burst of oscillations, the reflection of which provides the indication. The fluorescent screen is provided with a graduated scale suitably proportioned with the rate of traverse of the beam across the screen of the tube.

It is possible that due to the capacity between the grid 23 and the conducting plate 22 any voltage applied to the grid 23 by the receiver will cause current to flow through this capacity and so produce undesired deflections of the cathode ray beam in the tube 8. To overcome this defect the capacity between an element 20 and the plate 22 must be made large compared with the capacity between the grid 23 and the plate 22 or, alternatively, or in addition, the undesired effect may be neutralized by feeding from the receiver 13 to the plate 22 through a suitable condenser a voltage 180° out of phase with the voltage applied to the grid 23.

Although the invention is of special application for detecting the presence of aircraft, it will be appreciated that it can be applied for detecting the presence of other moving objects. Again, although the presence or distance of an object is, in the particular example described, indicated visually, it will be understood that the method or means providing the indication are immaterial to the invention and, for example, an audible indication may be provided.

I claim as my invention:

1. Apparatus for detecting the presence of a moving object comprising means for transmitting oscillatory signals in bursts at spaced time intervals and means for receiving said signals after reflection by said object and wherein, in order to distinguish signals reflected by said moving object from signals reflected by stationary objects, means are provided to convert into amplitude changes the phase changes which occur between successive signals reflected from said moving object by virtue of its movement and oscillations bearing a fixed phase relationship with the signals transmitted, said last-mentioned means including means for comparing the signals received after one burst of oscillation with the signals received after a second burst of oscillation and further means for separating signals of substantially the same amplitude from those signals whose amplitude has changed, said separated signals being applied to an indicating device, said means for comparing and for separating signals including individual storage devices and means for applying the signals received after one burst of oscillation to said storage devices, said last means serving to apply corresponding received signals after the next burst of oscillation to the same storage devices, said storage devices being arranged to provide an output if the signals applied to said storage devices change in amplitude.

2. Apparatus for detecting the presence of a moving object comprising means for transmitting oscillatory signals in bursts at spaced time intervals and means for receiving said signals after reflection by said object and wherein, in order to distinguish signals reflected by said moving object from signals reflected by stationary objects, means are provided to convert into amplitude changes the phase changes which occur between successive signals reflected from said moving object by virtue of its movement and oscillations bearing a fixed phase relationship with the signals transmitted, said last-mentioned means including means for comparing the signals received after one burst of oscillation with the signals received after a second burst of oscillation and further means for separating signals of substantially the same amplitude from those signals whose amplitude has changed, said separated signals being applied to an indicating device, said means for comparing and for separating signals including a cathode ray tube having a signal plate which has storage elements associated therewith to form a series of condensers and means comprising a control electrode in the vicinity of said elements to which signals from said amplitude converting means are supplied for applying the signals received after one burst of oscillation to said storage elements, said last means serving to apply corresponding received signals after the next burst of oscillation to the same storage elements, and means for causing the electron beam of the cathode ray tube to traverse said elements successively whereby an output may be taken off said signal plate if the signals applied to said elements change in amplitude.

3. Apparatus according to claim 1, wherein said indication is visual and is provided by a cathode ray tube and including means for causing the electron beam of the tube to trace a pattern, such as a line, which is modified on reception of a succession of signals from a moving object to indicate the presence or the distance of said object.

4. Apparatus according to claim 2, wherein the indication of the presence or distance of a moving object is visual and means are provided for causing the electron beam of a cathode ray tube providing said visual indication to commence the traverse of a pattern simultaneously with the transmission of a signal and further means are provided to cause the electron beam of the cathode ray tube containing said storage elements simultaneously to commence its traverse of said elements.

5. Apparatus according to claim 2, wherein in order to reduce deleterious effects due to capacity between said control electrode and said signal plate, the capacity between the individual elements cooperating with the signal plate, and said signal plate is made large compared with the capacity between said control electrode and said signal plate.

6. In combination, means for comparing the phase of one signal with that of another signal and for supplying an output signal of varying amplitude in response to variations in the phase relation of said signals, means comprising a cathode ray storage tube for passing said varying amplitude signals to the exclusion of constant amplitude signals, said storage tube providing internal cancellation of constant amplitude signals, an indicator, and means for supplying to said indicator the varying amplitude signals passed by said storage tube.

7. In combination, means for transmitting oscillatory signals, means for receiving said signals after reflection from an object, said receiving means including means for mixing said received signals with signals whose oscillations provide a phase reference whereby there are obtained signals which are of varying amplitude when reflected from moving objects, means comprising a cathode ray storage tube for passing said varying amplitude signals to the exclusion of constant amplitude signals, and means for taking said varying amplitude signals off said storage tube.

8. In combination, means for transmitting pulses of oscillatory signals, means for receiving said signals after reflection from an object, said receiving means including means for mixing said received signals with signals whose oscillations bear a fixed phase relationship with the oscillations of the signal pulses transmitted whereby there are obtained signals which are of constant amplitude when reflected from fixed objects and signals of varying amplitude when reflected from moving objects, means comprising a cathode ray storage tube for passing said varying amplitude signals to the exclusion of said constant amplitude signals, an indicator, and means for supplying said varying amplitude signals to said indicator.

9. Apparatus for detecting the presence of a moving object comprising means for transmitting oscillatory signals in bursts at spaced time intervals and means for receiving said signals after reflection by said object and wherein, in order to distinguish signals reflected from said moving objects from signals reflected by stationary objects, means are provided to convert into amplitude changes the phase changes which occur between successive bursts of signals reflected from said moving object by virtue of its movement and oscillations bearing a fixed phase relationship with the signals transmitted, means comprising a cathode ray storage tube for separating the pulses of varying amplitude from those of constant amplitude, a cathode ray indicator tube, and means for supplying said varying amplitude pulses from said storage tube to said indicator tube.

10. In combination, a pulse transmitter, a receiver to receive reflected signals, means for converting the phase of the signals reflected from the object under observation into amplitude variations, means for initiating a storage period by a first transmitted pulse and for terminating said storage period by a second transmitted pulse whereby said storage period is equal to and is a function of the time interval between said first and second transmitted pulses, means for storing a received signal for the duration of said storage period, and means for comparing with said stored signals received at a later time interval that is equal to the period between said first transmitted pulse and said second transmitted pulse.

11. Apparatus for detecting the presence of a moving object comprising means for transmitting oscillatory signals in bursts at spaced time intervals and means for receiving said signals after reflection by said object and wherein, in order to distinguish signals reflected by said moving object from signals reflected by stationary objects, means are provided to convert into amplitude changes the phase changes which occur between successive signals reflected from said moving object by virtue of its movement and oscillations bearing a fixed phase relationship with the signals transmitted, and further means being provided for utilizing said amplitude changes to provide an indication of the presence of said moving object, said last means comprising means to compare the signals received after one burst of oscillation with the signals received after a second burst of oscillation, further means being provided for separating signals of substantially the same amplitude from those signals whose amplitude has changed, an indicating device, and means for applying said separated signals to said indicating device.

12. In combination, means for transmitting pulses of oscillatory radio signals toward a reflecting object, means for receiving said signals after reflection, said receiving means including means for mixing said received signals with phase comparison signals whereby output pulses of varying amplitude are produced in response to variations in the phase relation of said signals, means comprising a cathode ray storage tube for passing said varying amplitude signals to the exclusion of constant amplitude signals, said cathode ray storage tube being of the single electron gun type comprising a storage screen having capacity storage elements, means for sweeping the cathode ray repeatedly across said storage screen in synchronism with said pulse transmission whereby the storage elements of said storage screen acquire an equilibrium potential due to secondary electron emission so long as no signals of changing amplitude are applied to said storage tube, means for applying the output signals of said receiving means to said storage tube to upset said equilibrium potential in response to any change in the amplitude of said output signals, and means for taking off said storage tube the signals resulting from said upsetting of said equilibrium potential.

13. In combination, means for transmitting pulses of oscillatory radio signals toward a reflecting object, means for receiving said signals after reflection, said receiving means including means for mixing said received signals with phase comparison signals whereby output pulses of varying amplitude are produced in response to variations in the phase relation of said signals, a cathode ray storage tube of the single electron gun type comprising a storage screen having capacity storage elements and a screen electrode immediately adjacent to said storage screen and on the gun side thereof, means for sweeping the cathode ray repeatedly across said storage screen in synchronism with the transmission of said pulses whereby the storage elements of said storage screen acquire an equilibrium potential due to secondary electron emission so long as no signals of changing amplitude are applied to said storage tube, means for applying the output signals of said receiving means to said storage tube to upset said equilibrium potential in response to any change in the amplitude of said output signals, and means for taking off said storage tube the signals resulting from said upsetting of said equilibrium potential.

14. In combination, means for transmitting oscillatory signals, means for receiving said signals after reflection from an object, said receiving means including means for mixing said received signals with signals whose oscillations bear a fixed phase relationship with the signals transmitted whereby there are obtained signals which are of constant amplitude when reflected from fixed objects and signals of varying amplitude when reflected from moving objects, means comprising a cathode ray storage tube for passing said varying amplitude signals to the exclusion of said constant amplitude signals, said storage tube including a storage screen comprising a sheet of insulating material having a conducting sheet or back plate on one side and having capacity storage elements on the opposite or front side, a screen electrode positioned in front of and immediately adjacent to said storage elements, means for producing an electron beam and directing it through said screen and against said capacity storage elements whereby they emit secondary electrons to bring said storage elements to an equilibrium potential, means for causing said electron beam to sweep across said storage screen successively whereby signals are passed by said tube only in response to a change in said equilibrium potential caused by the occurrence of said varying amplitude signals.

15. In combination, means for transmitting pulses of oscillatory radio signals toward a reflecting object, means for receiving said signals after reflection, said receiving means including means for mixing said received signals with signals whose oscillations have a fixed phase relationship with the oscillations of the transmitted signals, a cathode ray storage tube of the single electron gun type comprising a storage screen having capacity storage elements on the electron gun side thereof and having a conducting surface on the other side thereof, a screen electrode immediately adjacent to said storage screen and on the gun side thereof, means for sweeping the cathode ray repeatedly across said storage screen in synchronism with the transmission of said pulses whereby the storage elements of said storage screen acquire an equilibrium potential due to secondary electron emission so long as no signals of changing amplitude are applied to said storage tube, means for varying the potential difference between said screen electrode and said conducting surface by the output signals of said receiving means to upset said equilibrium potential in response to any change in the amplitude of said output signals, and means for taking off said storage tube the signals resulting from said upsetting of said equilibrium potential.

16. Apparatus for detecting the presence of a moving object comprising means for transmitting oscillatory signals in bursts at spaced time intervals and means for receiving said signals after reflection by said object and wherein, in order to distinguish signals reflected from said moving object from signals reflected by stationary objects, means are provided to convert into amplitude changes the phase changes which occur between successive bursts of signals reflected from said moving object by virtue of its movement and oscillations bearing a fixed phase relationship with the signals transmitted, means for separating the resulting pulses of varying amplitude from those of constant amplitude, said last means comprising a cathode ray storage tube having a storage screen and having means for producing an electron beam and directing it against said storage screen, means for sweeping said electron beam across said screen in a predetermined time relation with respect to the transmission of said bursts of signals, a screen electrode positioned adjacent to said storage screen and on the beam side thereof, and means for applying said resulting pulses to said screen electrode.

JOHN COLLARD.

REFERENCES CITED

The following references are of record in the file of this patent:

UNITED STATES PATENTS

| Number | Name | Date |
|---|---|---|
| 1,750,668 | Green | Mar. 18, 1930 |
| 2,189,549 | Hershberger | Feb. 6, 1940 |
| 2,193,361 | Rice | Mar. 12, 1940 |
| 2,403,625 | Wolff | July 9, 1946 |
| 2,412,631 | Rice | Dec. 17, 1946 |